(12) United States Patent
Khan (10) Patent No.: US 8,056,553 B2
(45) Date of Patent: Nov. 15, 2011

(54) CONDENSATE PAN WITH CONDENSATE TRAP

(75) Inventor: Tabraiz Ali Khan, Wichita, KS (US)

(73) Assignee: Johnson Controls Technology Company, Holland, MI (US)

( * ) Notice: Subject to any disclaimer, the term of this patent is extended or adjusted under 35 U.S.C. 154(b) by 746 days.

(21) Appl. No.: 11/856,889

(22) Filed: Sep. 18, 2007

(65) Prior Publication Data

US 2008/0314375 A1    Dec. 25, 2008

Related U.S. Application Data (60) Provisional application No. 60/945,978, filed on Jun. 25, 2007.

(51) Int. Cl.
*F24H 3/06* (2006.01)

(52) U.S. Cl. .............. 126/116 R; 126/99 R; 126/110 R; 137/312

(58) Field of Classification Search .............. 126/110 R, 126/116 R, 20; 4/351; 62/285, 291; 137/247.33, 137/312, 574

See application file for complete search history.

(56) References Cited

U.S. PATENT DOCUMENTS

| | | | | |
|---|---|---|---|---|
| 1,839,516 A | * | 1/1932 | Wetherbee | 122/4 R |
| 4,289,730 A | * | 9/1981 | Tomlinson | 422/178 |
| 4,835,984 A | * | 6/1989 | Vyavaharkar et al. | 62/285 |
| 5,309,890 A | * | 5/1994 | Rieke et al. | 126/110 R |
| 5,313,930 A | * | 5/1994 | Kujawa et al. | 126/116 R |
| 5,320,087 A | * | 6/1994 | Froman | 126/110 R |
| 5,375,586 A | * | 12/1994 | Schumacher et al. | 126/110 R |
| 5,379,749 A | * | 1/1995 | Rieke et al. | 126/110 R |
| 5,379,751 A | * | 1/1995 | Larsen et al. | 126/110 R |
| 5,439,050 A | * | 8/1995 | Waterman et al. | 165/170 |
| 5,448,986 A | * | 9/1995 | Christopher et al. | 126/110 R |
| 5,582,159 A | * | 12/1996 | Harvey et al. | 126/110 R |
| 5,704,343 A | * | 1/1998 | Ahn et al. | 126/110 R |
| 5,749,355 A | * | 5/1998 | Roan et al. | 126/110 R |
| 5,775,318 A | * | 7/1998 | Haydock et al. | 126/110 R |
| 6,116,266 A | * | 9/2000 | Dickison et al. | 137/312 |
| 6,283,144 B1 | * | 9/2001 | Kahn | 137/357 |
| 7,036,498 B2 | * | 5/2006 | Riepenhoff et al. | 126/110 R |
| 2005/0138939 A1 | * | 6/2005 | Spanger | 62/150 |
| 2007/0151604 A1 | | 7/2007 | Platusich et al. | |

FOREIGN PATENT DOCUMENTS

CA    2125092    7/1997

\* cited by examiner

*Primary Examiner* — Steven B McAllister
*Assistant Examiner* — Desmond Peyton
(74) *Attorney, Agent, or Firm* — McNees Wallace & Nurick LLC (57) ABSTRACT

A condensate pan for a condensing furnace includes a main chamber to receive exhaust gases, a condensate trap separate from the main chamber and internal the condensate pan and a main drain.

19 Claims, 7 Drawing Sheets

CONDENSATE PAN WITH CONDENSATE TRAP

CROSS-REFERENCE TO RELATED APPLICATIONS

This application claims the benefit of U.S. Provisional Application No. 60/945,978, filed Jun. 25, 2007, which is hereby incorporated by reference.

BACKGROUND

The present disclosure relates generally to condensate pans and condensate traps for furnace applications in HVAC&R systems.

The basic components of a furnace system include a burner; a heat exchanger; an air distribution system; and a vent pipe. In the burner, a fuel, often gas (natural or propane) or oil, is delivered and burned to generate heat. The heat exchanger is used to transfer the heat from the burning fuel to the air distribution system. The air distribution system, which generally includes a blower and ductwork, delivers the heated air to the space to be heated and returns cooler air to the furnace. The vent pipe or flue exhausts byproducts of combustion to the external environment.

In high efficiency furnaces, also commonly referred to as condensing furnaces, significant amounts of water condense from the flue gas within the heat exchanger that must be collected in a condensate pan and drained separately from the flue gas exiting by the vent pipe. Conventional condensate traps are external to the condensate pan and typically require an extra 6 to 8 inches of clearance that is not always readily available.

Furthermore, furnaces are generally manufactured so that each furnace can be installed vertically or horizontally in any one of four configurations—upflow, downflow, horizontal right or horizontal left. The furnaces are usually shipped from the factory with the condensate trap and associated drain hoses already installed for one of these configurations, so the furnace installer must ordinarily move the condensate trap to a new position if the furnace is to be installed in one of the three other configurations.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a condensate pan for use in a condensing furnace that has an internal condensate trap. The condensate trap may be formed integral with the condensate pan.

Another embodiment relates to a condensate pan that has multiple internal condensate traps for use in a multi-position condensing furnace so that the same condensate pan can be used in any one of the different furnace positions.

Certain advantages of the embodiments described herein are that by making the condensate trap internal to the condensate pan, external condensate traps may be eliminated resulting in desirable space savings, among other advantages which will be readily apparent to those of ordinary in skill upon reviewing the present disclosure. Furthermore, by making the condensate trap internal to the condensate pan, additional labor associated with moving the condensate trap to an alternate position can be avoided, for example, when the furnace is a multi-position furnace that is to be installed in a configuration different than shipped from the factory.

Alternative exemplary embodiments relate to other features and combinations of features as may be generally recited in the claims.

DETAILED DESCRIPTION OF THE EXEMPLARY EMBODIMENTS

Figure 1:
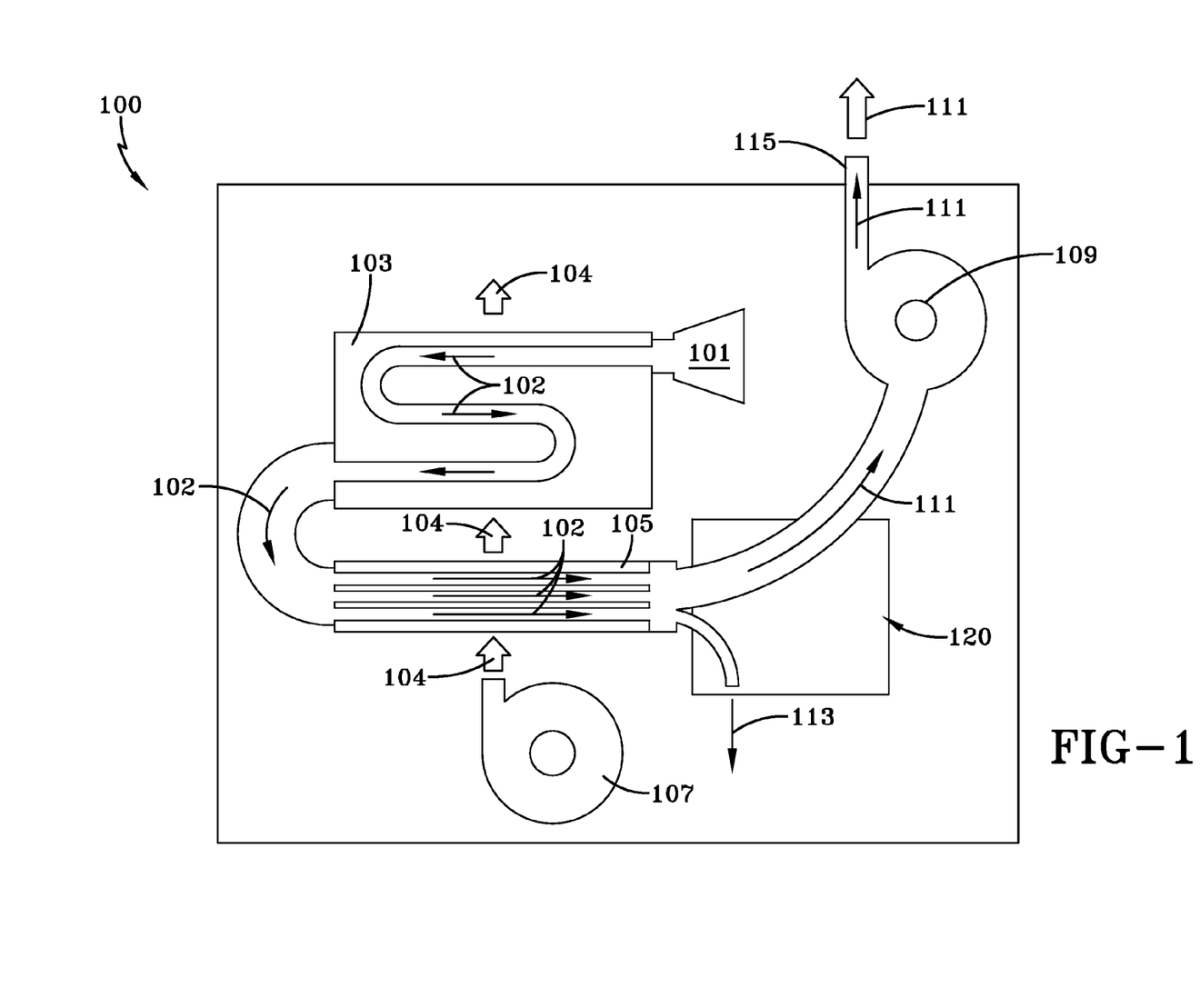
FIG. 1 is a schematic embodiment of a condensing furnace.

FIG. 1 shows a schematic arrangement of a condensing furnace 100 according to an embodiment of the disclosure. During operation, a burner 101 combusts a fuel within combustion air 102 and provides hot combustion by-products and heated air to a first heat exchanger 103, where heat is transferred to supply air 104. Supply air 104 is air that is to be heated, such as interior air for a building HVAC system. The now cooler combustion air 102 is then directed into a second heat exchanger 105, where additional heat is exchanged with supply air 104. Supply air 104 is directed over first heat exchanger 103 and second heat exchanger 105 by use of a blower 107 or similar air-moving device.

As combustion air 102 exchanges heat with supply air 104, a portion of the water vapor in combustion air 102 condenses to a liquid. A resultant liquid condensate 113 emerges from second heat exchanger 105 and falls into a condensate pan 120 and is eventually directed out of the condensing furnace 100. Likewise, the uncondensed portion of combustion air 102 emerges from second heat exchanger 105 as exhaust 111 and is removed from furnace 100 by use of an exhaust blower, or inducer, 109 or similar air-moving device through a vent, such as vent pipe 115. Exhaust 111 includes air, water vapor and other combustion products.

Condensate 113 formed in second heat exchanger 105, in addition to water, may contain combustion products and other contaminants that can be acidic and/or corrosive. Second heat exchanger 105 and the areas in which the liquid condensate 113 forms and flows can be fabricated using corrosion resistant materials such as stainless steel (e.g., 29-4c stainless steel) or other heat resistant, corrosion resistant materials, such as plastic.

Figure 1A:
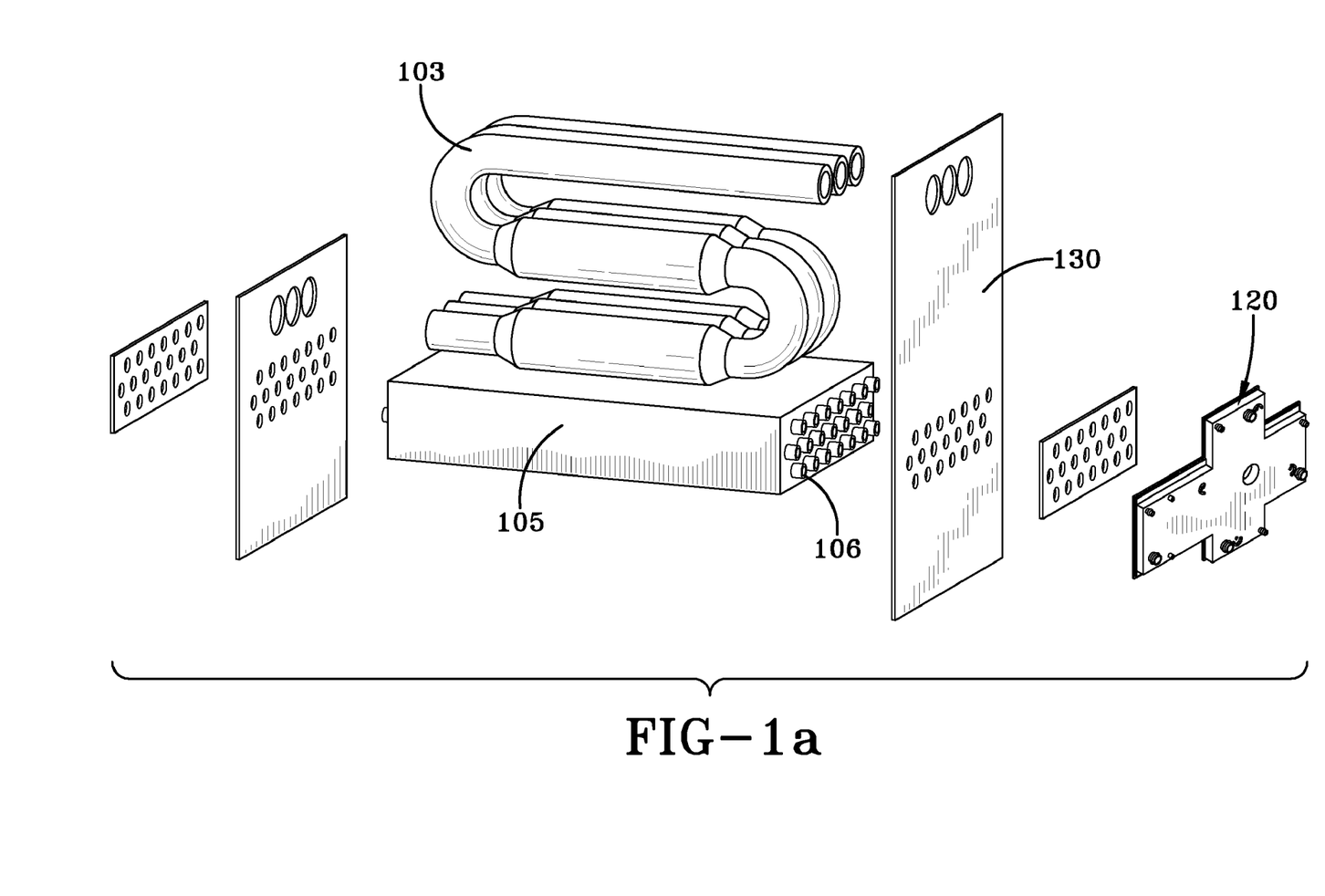
FIG. 1*a* is a view of an embodiment of the heat exchanger portion of a condensing furnace.

Referring to FIG. 1*a*, an exploded view of a heat exchanger section of condensing furnace 100 is illustrated. The hot, gaseous combustion byproducts in combustion air 102 exiting the burner enter first heat exchanger 103 at the top of a vestibule 130 that houses first and second heat exchangers 103, 105 after which combustion air 102 passes from first heat exchanger 103 to second heat exchanger 105. As illustrated, first heat exchanger 103 includes three large heat exchanger tubes, while second heat exchanger 105 includes multiple, smaller heat exchanger tubes. However, any number of heat exchanger tubes can be used in the first and second heat exchangers 103, 105. As previously described, heat from combustion air 102 in the heat exchanger tubes is transferred to cooler supply air 104 forced by blower 109 to pass first over second heat exchanger 105 and then first heat exchanger 103 (FIG. 1).

The cooled byproducts leave the heat exchanger section of furnace 100 at the outlet 106 of second heat exchanger 105 where exhaust 111 is eliminated via vent pipe 115, while liquid condensate 113 falls by gravity to the bottom of condensate pan 120.

Figure 8:
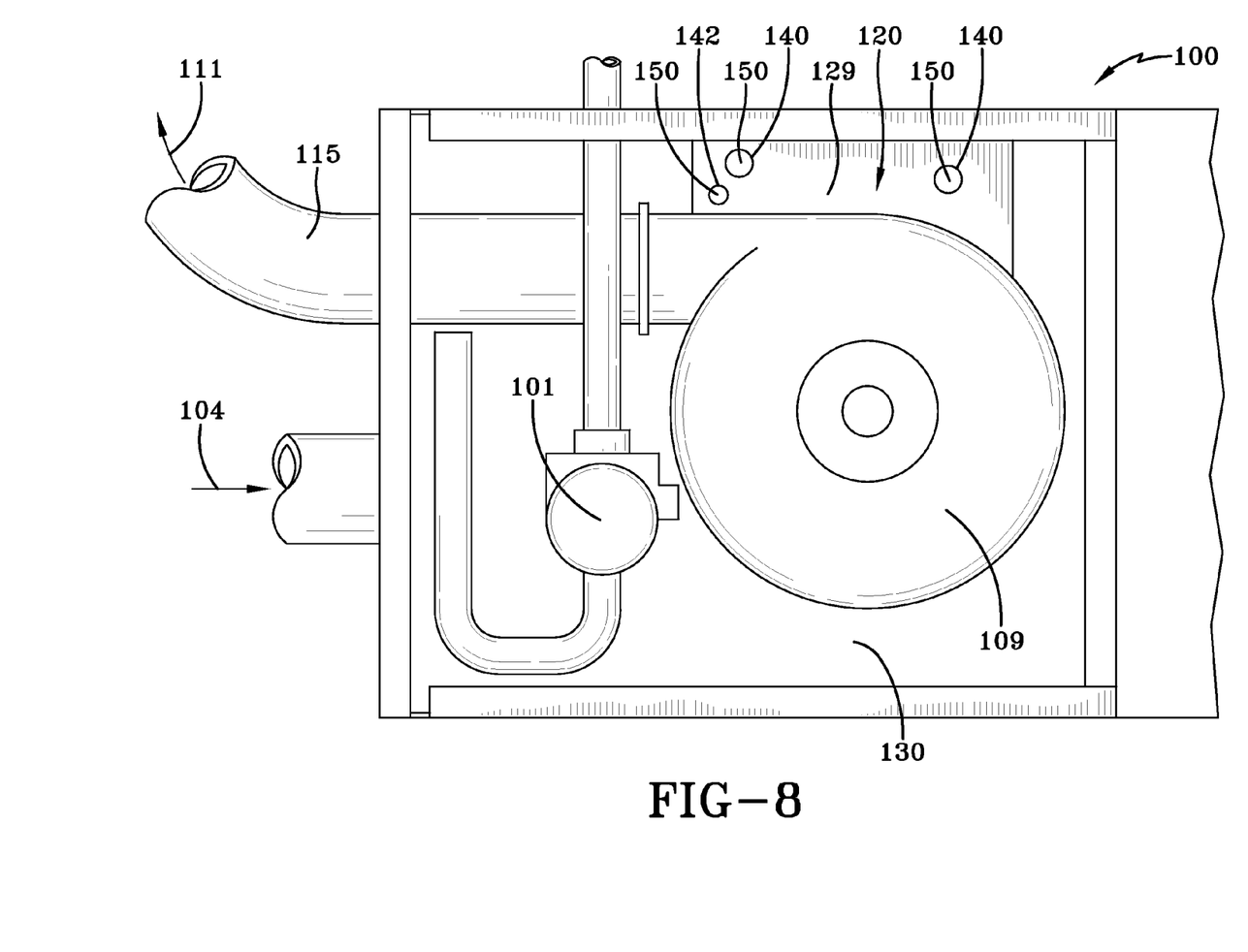
FIG. 8 is a portion of a furnace illustrating a mounted condensate pan.

Condensate pan 120 is positioned intermediate second heat exchanger outlet 106 and inducer 109 that draws combustion air 102 from the heat exchangers as exhaust 111 and forces it out of vent pipe 115. The condensate pan 120 is firmly mounted to vestibule 130 to reduce and/or prevent exhaust 111 or liquid condensate 113 from leaving condensing furnace 100 other than first passing through condensate pan 120. FIG. 8 illustrates condensate pan 120 installed in furnace 100 and mounted on vestibule 130 intermediate inducer 109 and secondary heat exchanger outlets 106.

Figure 2:
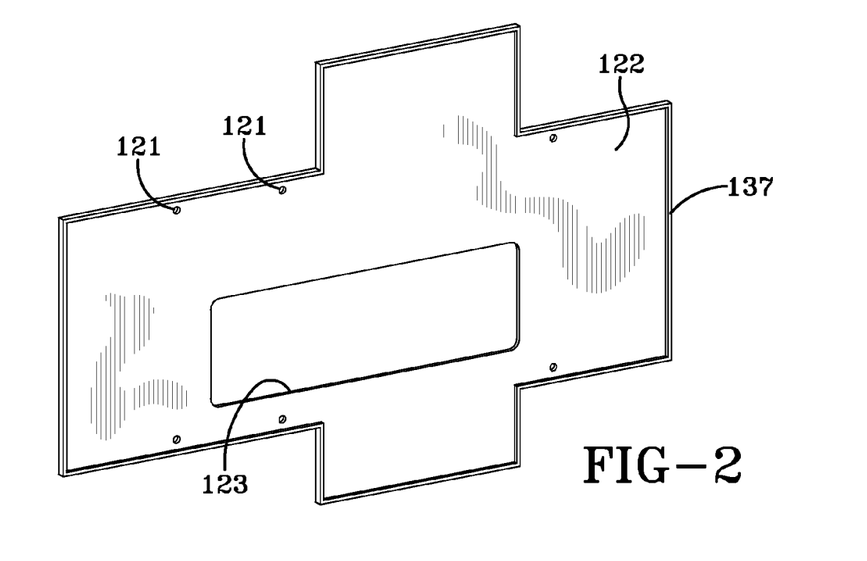
FIG. 2 is an embodiment of a condensate pan cover.
Figure 3:
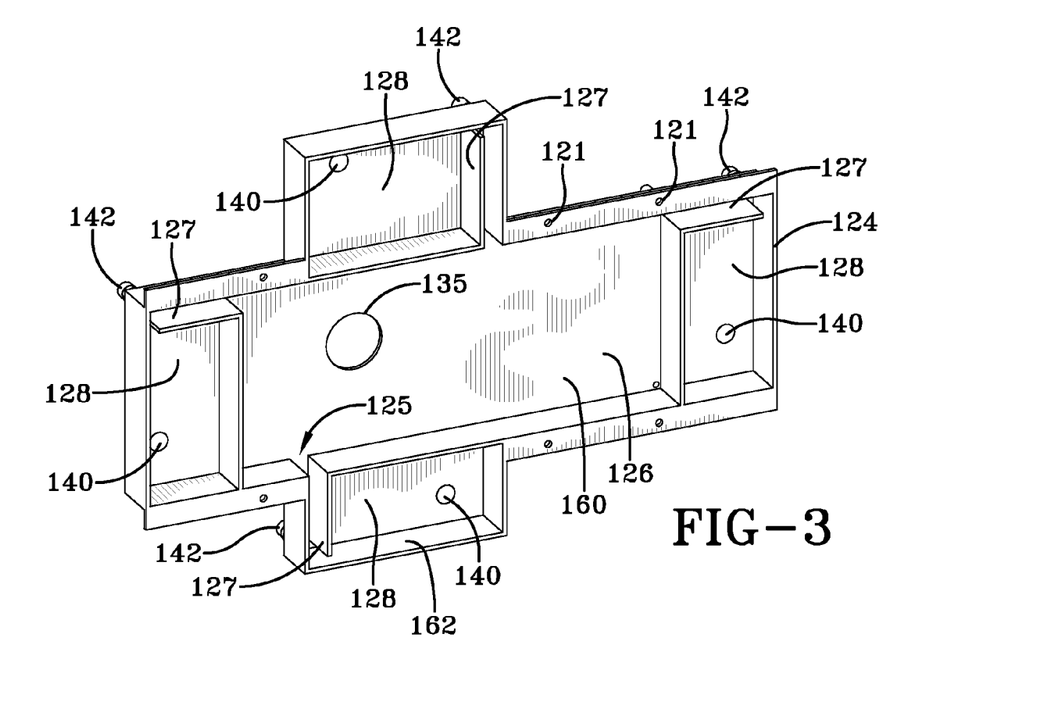
FIG. 3 is an embodiment of a condensate pan having an internal condensate trap.
Figure 4:
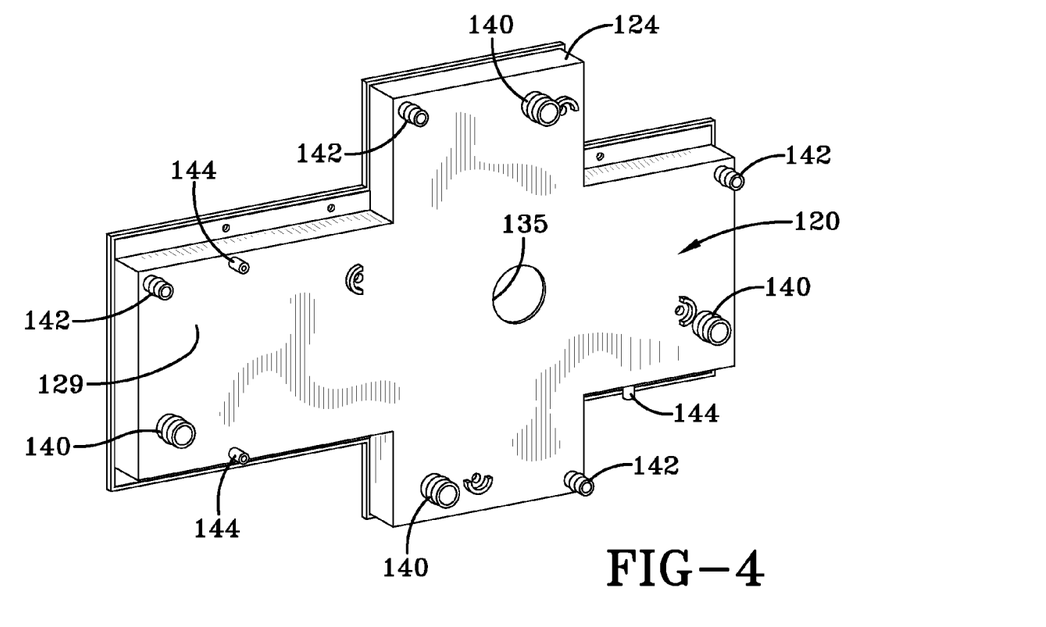
FIG. 4 is an alternative view of the embodiment of the condensate pan shown in FIG. 3.

Turning to FIGS. 2-4, condensate pan 120 includes a pan body 124 (FIGS. 3 & 4) and may include a pan cover 122 (FIG. 2). Pan body 124 and pan cover 122 can be separate pieces that can be attached together using any suitable method of attachment, such as using mechanical or chemical methods of attachment, or they could be molded, heat sealed or otherwise manufactured as a single piece.

As illustrated in FIGS. 2 and 3, the pan body 124 and pan cover 122 are separate pieces provided with numerous apertures 121 for fasteners to connect them together, and which may also be used to attach condensate pan 120 to vestibule 130 and/or to attach inducer 109 to condensate pan 120. Condensate pan 120 may be constructed of any suitable material, but should generally be resistant to corrosion. Exemplary materials of construction include plastic and stainless steel (e.g., 29-4c stainless steel).

Where multiple separate pieces are used for pan cover 122 and pan body 124, a heat seal or glue can be employed between them to prevent leaking. A gasket 137 may be formed or embedded in either the pan cover 122 and/or pan body 124 to seal the outer surfaces against inducer 109 and/or vestibule 130. Alternatively, the gasket may be provided as a separate piece to be inserted during assembly. As also shown in FIG. 2, pan cover 122 includes an exchanger aperture 123 to receive second heat exchanger outlet 106 that permits condensate 113 and exhaust 111 to directly enter condensate pan 120.

As the exhaust 111 entering condensate pan 120 from second heat exchanger 105 is removed by the inducer mounted to the exterior surface 129 (FIG. 4) of condensate pan 120, the heavier liquid condensate 113 falls by gravity into a main chamber 126 of condensate pan 120 and flows via a condensate channel 125 into a condensate trap 128 formed internal to condensate pan 120, such as integral with pan body 124.

The condensate trap 128 is bounded by the bottom wall 160 of the condensate pan 120 and a top cover. The top cover is generally provided by pan cover 122; however the top cover may be provided by vestibule 130, for example, if pan body 124 is mounted directly to vestibule 130. The condensate pan bottom wall 160 and top cover act as vertical side walls of condensate trap 128 when in use. As shown in FIG. 3, a portion of a side wall 162 of the condensate pan intermediate the bottom wall 160 and top cover defines the bottom of condensate trap 128 when in use. Condensate trap 128 can be separated from main chamber 126 by a baffle 127 extending from a top portion of condensate pan side wall 162 internal condensate pan 120, such as the L-shaped baffle shown in FIG. 3. A portion of baffle 127 and a portion of side wall 162 together form condensate channel 125. Although the features of the condensate trap 128 internal the condensate pan 120 are shown and described as features of pan body 124, it will be appreciated that various features of the condensate pan 120 that define the condensate trap 128, such as baffle 127 and/or sidewall 162, could instead be formed as part of pan cover 122.

Figure 6:
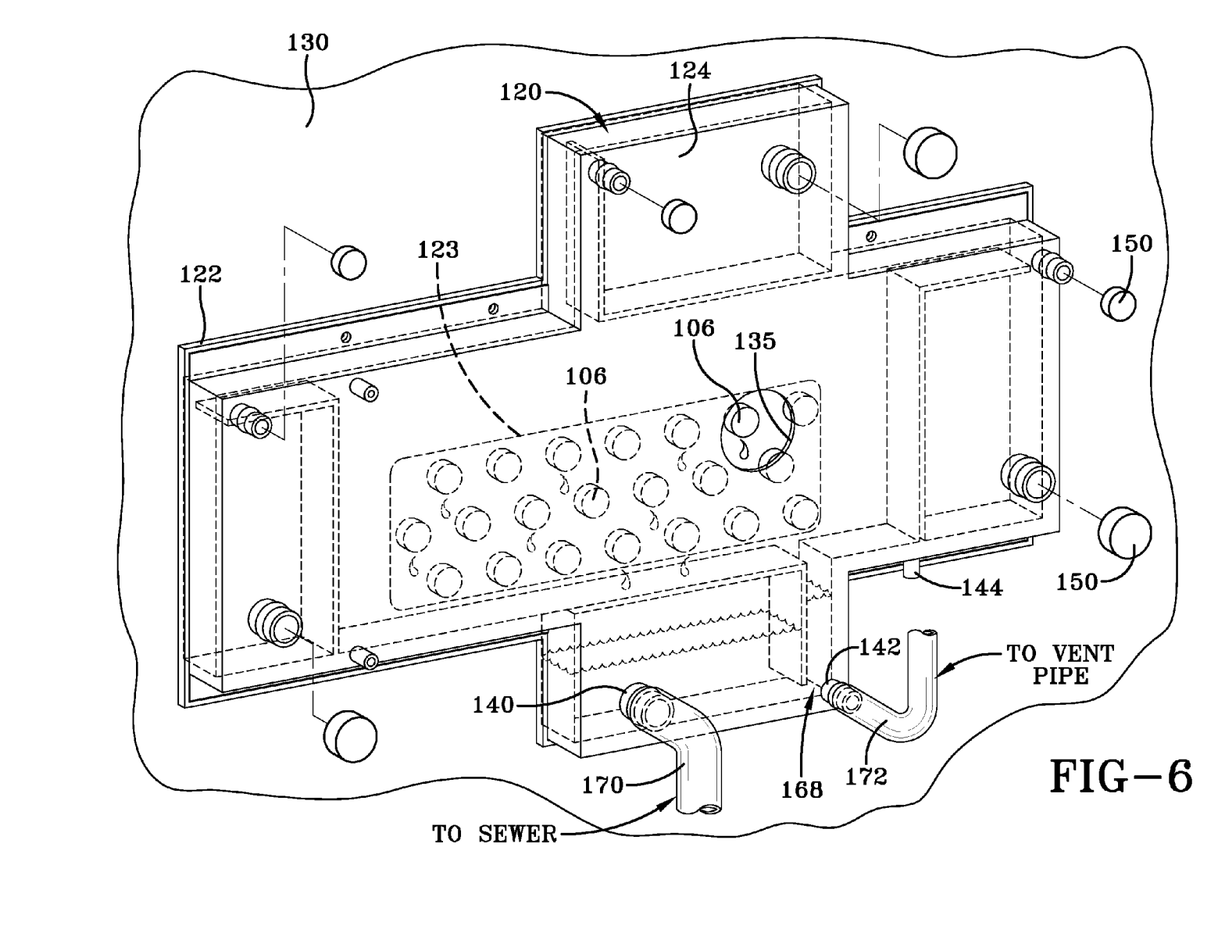
FIG. 6 is a view of an embodiment of a condensate pan having an internal condensate trap connected to a furnace.

FIG. 6 illustrates a condensate pan 120 mounted to vestibule 130, which shows the manner in which second heat exchanger outlets 106 protrude into condensate pan 120 via exchanger aperture 123 such that exhaust 111 exiting second heat exchanger 105 is drawn through inducer aperture 135 by inducer 109 (better seen in FIG. 8 and omitted here for clarity) mounted to the exterior surface of condensate pan 120 and such that liquid condensate 113 exiting second heat exchanger outlets 106 falls by gravity from main chamber 126 into condensate trap 128 via condensate channel 125, and eventually out of condensate pan 120 through a main drain 140.

As liquid condensate 113 enters into main chamber 126, it flows into condensate channel 125 and enters trap 128 at a gate 168 at the end of condensate channel 125. The liquid condensate 113 begins to fill trap 128 from the bottom up and rises until it reaches main drain 140 that allows the liquid to flow out of condensate pan 120, usually through a drain hose 170 to the sewer or other external source. Baffle 127 is formed within condensate pan 120 at a pre-determined location, having a pre-determined length and spaced a pre-determined width away from side wall 162 such that under steady state conditions during condensing furnace operation, liquid condensate 113 flowing into trap 128 substantially matches the liquid condensate 113 flowing out of condensate trap 128. Baffle 127 is further formed and positioned so that there is a steady state liquid level within trap 128 both high enough to maintain a barrier of liquid between inducer 109 and main drain 140 and low enough that the liquid does not substantially back up into main chamber 126 under ordinary conditions. More particularly, the baffle 127 can be positioned so that the gate 168 and channel 125 are sufficiently narrow that condensate 113 backs up into channel 125 to a level higher than in trap 128 under steady state operating conditions.

Those of ordinary skill in the art will readily appreciate that determining the appropriate dimensions and positioning of baffle 127 depends on the strength of the particular inducer 109 to be used in conjunction with condensate pan 120. The more powerful the inducer 109, the stronger the draw on the condensate 113, and the longer or wider the channel 125 and/or the wider the gate 168 needed to provide a reservoir of condensate 113 between main chamber 126 and main drain 140.

Keeping liquid between main chamber 126 and main drain 140 avoids sewer gas being drawn by inducer 109 from main drain 140 back into condensate pan 120. Keeping liquid from backing up into main chamber 126 reduces the likelihood of system malfunction, which can occur due to a rise in pressure if water backs up into second heat exchanger 105. The main chamber 126 can also include one or more blocked condensate tabs 144, which can be connected to a pressure switch, so that if the liquid level rises faster than it can drain, the furnace 100 can be shut down.

In addition to main drain 140, condensate trap 128 can also include a flue drain 142. The flue drain 142 allows a flue drain hose 172 or other connection to vent pipe 115 so that any liquid condensate 113 that might form in vent pipe 115 as exhaust 111 continues to cool, flows back to condensate pan 120 and can be drained. Thus, while condensate 113 flows out of pan 120 via main drain 140, condensate 113 forming in vent pipe 115 flows back into pan 120 via flue drain 142. Flue drain 142 can be positioned below its associated main drain 140 so that any condensate 113 from vent pipe 115 enters condensate trap 128 below the steady state liquid level, preventing inducer 109 from drawing discharged exhaust 111 back into condensate pan 120. This can further be achieved by positioning flue drain 142 near the gate 168 within condensate channel 125.

As illustrated in FIG. 6, condensate pan 120 includes four different internal, integrally formed, condensate traps 128. This provides an integral condensate trap 128 for each of four possible common furnace configurations (upflow, downflow, horizontal left and horizontal right), but may avoid any modifications that would require removal of the pan 120 from the vestibule 130 or other extensive labor by a technician other than minor work like the connection of appropriate hoses to the active (i.e. lowest) condensate trap 128. Openings used as part of the active condensate trap 128 for a particular furnace configuration can be connected to appropriate plumbing, (i.e., hose from the drain to sewer, hose from flue drain to the flue pipe, hose from blocked condensate tab to condensate pressure switch, etc.). Conversely, openings associated with inactive internal condensate traps 128, (i.e. those not needed for the particular furnace configuration being used) may be closed, such as by caps 150, to prevent air external condensate pan 120 from being drawn into condensate pan 120 by inducer 109.

Turning to FIG. 4, which shows the exterior side 129 of pan body 124, condensate pan 120 includes a main drain 140 and flue drain 142 for each of the four condensate traps 128, so that regardless of which of four different furnace positions are employed, liquid condensate 113 leaving second heat exchanger outlet 106 still falls by gravity into an internal condensate trap 128 and out the main drain 140 associated with that particular trap. The main drain 140 and flue drain 142 can be positioned at any desirable location in the trap 128, provided the appropriate dimensions and spacings are met for controlling condensate back-up into the chamber and preventing backflow from entering via flue drain 142 above the steady state liquid level, as previously described. In one embodiment, main drain 140 is positioned about 0.5 inches to about 1 inch above the bottom of condensate trap 128, flue drain 142 is positioned about 0.1 inches to about 0.5 inches above the bottom of condensate trap 128, and condensate channel 125 is about 0.25 inches to about 0.75 inches wide, about 0.5 inches to about 2 inches deep, and about 1 inch to about 4 inches long, with a gate 168 of about 0.1 inches to about 0.5 inches long. It will be appreciated that the dimensions can be modified, for example, if the overall size of condensate trap 128 is modified.

While each trap 128 generally has its own main drain 140 and flue drain 142, condensate pan 120 may include as few as two blocked condensate tabs 144. Alternatively, a separate blocked condensate tab 144 can be provided for each condensate trap 128 or any intermediate number may also be provided, as illustrated in FIG. 4, in which three blocked condensate tabs 144 are present, with one blocked condensate tab 144 available for two different possible furnace positions.

Figure 5:
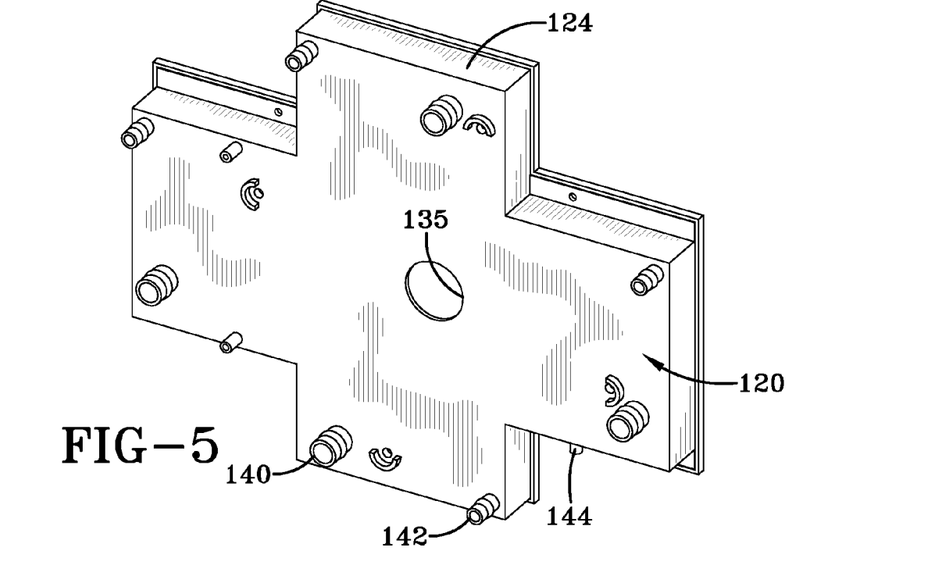
FIG. 5 is another embodiment of a condensate pan having an internal condensate trap.

The geometry of condensate pan 120, as well as the number and placement of condensate traps 128, main drains 140, flue drains 142, blocked condensate tabs 144 and inducer aperture 135 can all be adjusted as desired, as illustrated for example, by the different shaped pan bodies 124 shown in FIGS. 4 and 5, all of which may depend on several different variables, including overall space considerations, as well as inducer size and position within the condensing furnace 100.

Figures 7A, 7B:
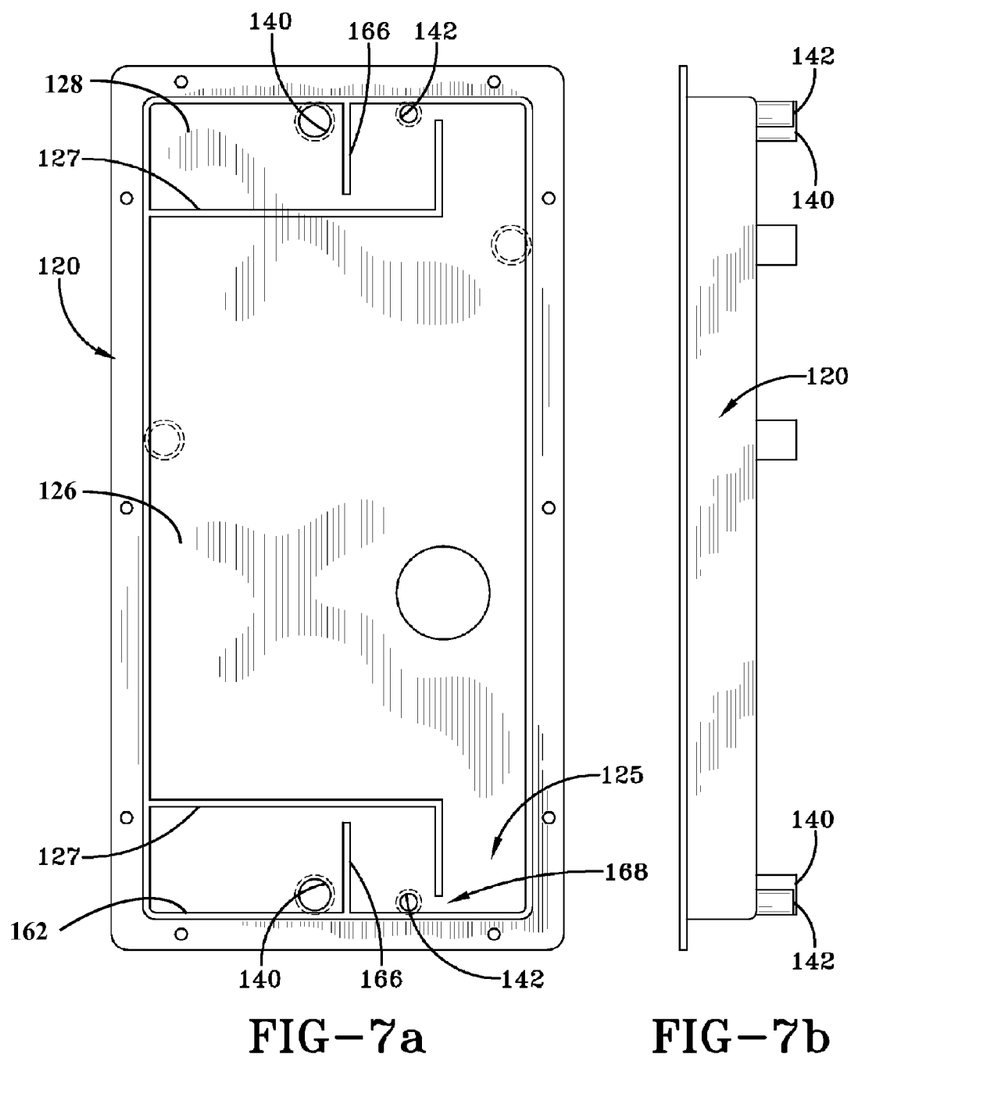
FIGS. 7*a* and 7*b* illustrate another embodiment of a condensate pan having an internal condensate trap.

FIGS. 7a and 7b show another embodiment in which a multi-position condensate pan 120 includes two internal condensate traps 128 for a two position furnace 100. Baffle 127 separates main chamber 126 from condensate trap 128, and together with side wall 162, defines condensate channel 125. FIG. 7a further illustrates that in certain embodiments, a retaining wall 166 can be provided in condensate trap 128 to separate main drain 140 from flue drain 142. The use of a retaining wall within the trap may provide more freedom in placement of flue drain 142 and/or main drain 140. After entering condensate trap 128 from the condensate channel 125, the condensate 113 must still rise to a level above the height of retaining wall 166 before entering the section of condensate trap 128 containing main drain 140.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the condensate pan as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. Other substitutions, modifications, changes and omissions may be made in the design, operating conditions and arrangement of the exemplary embodiments without departing from the scope of the present application.

What is claimed is:

1. A condensate pan for a furnace comprising:
   a chamber to receive exhaust gases;
   a plurality of condensate traps separate from the chamber and internal to the condensate pan, the plurality of condensate traps being configured and positioned to extend from the chamber to enable a condensate trap of the plurality of condensate traps to collect condensate for each pre-determined orientation of the furnace, and a pair of condensate traps of the plurality of condensate traps being positioned on opposite sides of the chamber;

a plurality of main drains, each condensate trap of the plurality of condensate traps having a corresponding main drain of the plurality of main drains; and wherein the plurality of condensate traps are configured and positioned to have a cruciform shape.

2. The condensate pan of claim 1, wherein the plurality of condensate traps are integral to the condensate pan.

3. The condensate pan of claim 1, further comprising a condensate pan cover.

4. The condensate pan of claim 1, further comprising a plurality of flue drains, each condensate trap of the plurality of condensate traps having a corresponding flue drain of the plurality of flue drains, wherein the flue drain of the condensate trap positioned to collect condensate is configured to be positioned beneath a steady state liquid level in the condensate trap when the condensate pan is in use in an operating furnace.

5. The condensate pan of claim 4, wherein the main drain of the condensate trap positioned to collect condensate is positioned higher than the flue drain of the condensate trap positioned to collect condensate.

6. The condensate pan of claim 4, wherein each main drain of the plurality of main drains is separated from a corresponding flue drain of the plurality of flue drains by a retaining wall.

7. A condensate pan for a furnace comprising:
a bottom wall;
a top cover;
a side wall intermediate the bottom wall and top cover;
a plurality of baffles extending between the bottom wall and top cover;
a main chamber being bounded by at a least a portion of the bottom wall, top cover, side wall and the plurality of baffles;
the main chamber is configured to receive at least one heat exchanger outlet from the furnace;
a plurality of trap portions, each trap portion of the plurality of trap portions being separated from the main chamber by a corresponding baffle of the plurality of baffles, the plurality of trap portions and the main chamber being configured and positioned to have a substantially cruciform shape, and wherein a trap portion of the plurality of trap portions is enabled to collect condensate during operation of the furnace; and
each trap portion of the plurality of trap portions includes a main drain positioned to allow collected liquid condensate to exit the trap portion.

8. The condensate pan of claim 7, wherein the top cover includes a heat exchanger aperture in fluid communication with the main chamber to receive the at least one heat exchanger outlet.

9. The condensate pan of claim 8, wherein the bottom wall includes an inducer aperture in fluid communication with the main chamber to provide fluid from the main chamber to an inducer of the furnace.

10. The condensate pan of claim 7, wherein each trap portion is defined by at least a portion of the bottom wall, top cover, side wall, and corresponding baffle.

11. The condensate pan of claim 10, wherein a portion of the corresponding baffle and corresponding side wall together define a condensate channel for directing condensate into the trap portion.

12. The condensate pan of claim 7, comprising a plurality of plurality of flue drains, each trap portion of the plurality of trap portions having a corresponding flue drain of the plurality of flue drains.

13. The condensate pan of claim 12, further comprising a plurality of retaining walls, each retaining wall of the plurality of retaining walls extending from a baffle into a corresponding trap portion, wherein the corresponding main drain of the trap portion and the corresponding flue drain of the trap portion are positioned on opposite sides of the retaining wall.

14. The condensate pan of claim 12, wherein the main drain of the trap portion positioned to collect condensate is positioned higher than the flue drain of the trap portion positioned to collect condensate.

15. A furnace having a plurality of mounting positions, the furnace comprising:
a burner;
a heat exchanger to receive combustion air from the burner, the heat exchanger having an outlet;
a blower configured to distribute supply air across the heat exchanger;
a vent;
an inducer positioned to evacuate exhaust from the outlet to the vent; and
a condensate pan positioned intermediate the outlet and the inducer, the condensate pan comprises:
a heat exchanger aperture to receive fluids from the outlet;
an inducer aperture to provide fluids from the condensate pan to the inducer for transmission to the vent;
more than two internal condensate traps, the more than two internal condensate traps being configured and positioned to enable a different internal condensate trap of the more than two internal condensate traps to collect condensate for each mounting position of the furnace;
a plurality of main drains, each internal condensate trap of the more than two internal condensate traps having a corresponding main drain of the plurality of main drains; and
wherein the more than two internal condensate traps are configured and positioned to have a substantially cruciform shape.

16. The furnace of claim 15, wherein the condensate pan comprises a chamber and a pair of internal condensate traps of the more than two internal condensate traps are positioned on opposite sides of the chamber.

17. The furnace of claim 15, wherein the condensate pan comprises a plurality of flue drains and each internal condensate trap of the more than two internal condensate traps has a corresponding flue drain of the plurality of flue drains.

18. The furnace of claim 17, wherein the flue drain of the internal condensate trap positioned to collect condensate is connected to the vent to receive liquid condensate from the vent into the internal condensate trap, wherein the flue drain of the internal condensate trap positioned to collect condensate is positioned below a steady-state level of liquid condensate in the enabled internal condensate trap used to collect condensate.

19. The furnace of claim 18, further comprising a blocked condensate tab positioned above a steady-state level of liquid condensate in the enabled internal condensate trap used to collect condensate.

* * * * *